US011792275B2

(12) United States Patent
Brooks et al.

(10) Patent No.: US 11,792,275 B2
(45) Date of Patent: *Oct. 17, 2023

(54) DYNAMIC CONNECTION CAPACITY MANAGEMENT

(71) Applicant: International Business Machines Corporation, Armonk, NY (US)

(72) Inventors: Michael D. Brooks, Southampton (GB); Philip I. Wakelin, Eastleigh (GB); Alan Hollingshead, Eastleigh (GB); Julian Horn, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,655

(22) Filed: Oct. 14, 2022

(65) Prior Publication Data

US 2023/0110415 A1 Apr. 13, 2023

Related U.S. Application Data

(63) Continuation of application No. 16/205,706, filed on Nov. 30, 2018, now Pat. No. 11,553,047.

(51) Int. Cl.
*G06F 15/16* (2006.01)
*H04L 67/148* (2022.01)
(Continued)

(52) U.S. Cl.
CPC ............ *H04L 67/148* (2013.01); *H04L 67/01* (2022.05); *H04L 67/141* (2013.01)

(58) Field of Classification Search
CPC ...... H04L 67/148; H04L 67/141; H04L 67/42
(Continued)

(56) References Cited

U.S. PATENT DOCUMENTS 5,442,749 A 8/1995 Northcutt
5,809,235 A 9/1998 Sharma
(Continued)

FOREIGN PATENT DOCUMENTS

EP 3471370 A1 * 4/2019 .......... H04L 63/029
EP 3471370 B1 8/2020
WO 2013085685 A1 6/2013

OTHER PUBLICATIONS

Improved dynamic load balancing algorithm based on Least-Connection Scheduling Liangshuai Zhu;Jianming Cui;Gaofeng Xiong 2018 IEEE 4th Information Technology and Mechatronics Engineering Conference (ITOEC) Year: 2018 | Conference Paper | Publisher: IEEE (Year: 2018) (Year: 2018).*

(Continued)

*Primary Examiner* — Oscar A Louie
*Assistant Examiner* — Oluwatosin M Gidado
(74) *Attorney, Agent, or Firm* — Richard B. Thomas

(57) ABSTRACT

Systems, methods, and computer program products for the dynamic management of the capacity of connections to a server. One method includes receiving a request to change a first connection to a server and determining active connections to the server. The method also includes determining a corresponding current capacity of each active connection and determining a new capacity for the first connection and the active connections to the server. The method further includes determining that a spare capacity of the server is insufficient for the first connection. The method also includes allocating a capacity to the first connection based on the request. The method further includes adjusting the current capacity of the active connections, including reducing the current capacity of at least a portion of the active connections in proportion to the respective current capacity of the one or more active connections.

25 Claims, 6 Drawing Sheets

(51) Int. Cl.
*H04L 67/141* (2022.01)
*H04L 67/01* (2022.01)

(58) Field of Classification Search
USPC .......................................................... 709/227
See application file for complete search history.

(56) References Cited

U.S. PATENT DOCUMENTS

| | | | |
|---|---|---|---|
| 5,812,784 | A | 9/1998 | Watson |
| 5,938,733 | A | 8/1999 | Heimsoth |
| 6,148,335 | A | 11/2000 | Haggard et al. |
| 6,195,682 | B1 | 2/2001 | Ho et al. |
| 6,298,386 | B1 | 10/2001 | Vahalia |
| 6,304,967 | B1 | 10/2001 | Braddy |
| 6,324,492 | B1 | 11/2001 | Rowe |
| 6,389,448 | B1 * | 5/2002 | Primak ............... H04L 67/1029 709/225 |
| 6,505,241 | B2 | 1/2003 | Pitts |
| 6,615,258 | B1 | 9/2003 | Barry |
| 6,804,674 | B2 | 10/2004 | Hsiao |
| 6,845,383 | B1 | 1/2005 | Kraenzel |
| 7,003,572 | B1 | 2/2006 | Lownsbrough |
| 7,152,111 | B2 | 12/2006 | Allred et al. |
| 7,164,653 | B1 | 1/2007 | Bezoza |
| 7,171,668 | B2 | 1/2007 | Molloy et al. |
| 7,403,886 | B2 | 7/2008 | Odhner et al. |
| 7,404,205 | B2 | 7/2008 | Scoredos |
| 7,568,030 | B2 | 7/2009 | Banerjee et al. |
| 7,580,972 | B2 | 8/2009 | Jones |
| 7,752,629 | B2 | 7/2010 | Revanuru |
| 7,774,492 | B2 | 8/2010 | Raphel et al. |
| 7,991,876 | B2 | 8/2011 | Yoda |
| 8,056,082 | B2 | 11/2011 | Koretz et al. |
| 8,224,963 | B2 | 7/2012 | Tsunogai |
| 8,335,847 | B2 | 12/2012 | Cassidy |
| 8,402,085 | B2 | 3/2013 | McCanne |
| 8,417,817 | B1 | 4/2013 | Jacobs |
| 8,799,502 | B2 | 8/2014 | Raphel |
| 8,825,820 | B2 | 9/2014 | Gerber et al. |
| 8,856,222 | B2 | 10/2014 | McCanne |
| 8,935,399 | B2 | 1/2015 | Rajan et al. |
| 9,172,650 | B2 | 10/2015 | Rajan et al. |
| 9,235,801 | B2 | 1/2016 | Portegys |
| 9,246,819 | B1 | 1/2016 | Thirasuttakorn |
| 9,253,025 | B1 | 2/2016 | Vinapamula Venkata |
| 9,473,571 | B2 | 10/2016 | Day |
| 9,479,575 | B2 | 10/2016 | Olsen |
| 9,558,227 | B2 | 1/2017 | Gocek et al. |
| 9,667,498 | B2 | 5/2017 | Wu |
| 9,749,899 | B2 | 8/2017 | Raleigh et al. |
| 10,148,579 | B2 | 12/2018 | Adams |
| 10,348,840 | B2 | 7/2019 | Brooks et al. |
| 10,412,022 | B1 | 9/2019 | Tang |
| 10,555,145 | B1 | 2/2020 | Siddiqui |
| 10,574,758 | B2 | 2/2020 | Brooks et al. |
| 10,616,346 | B2 | 4/2020 | Brooks et al. |
| 10,827,001 | B2 | 11/2020 | Brooks |
| 10,887,403 | B2 | 1/2021 | Brooks |
| 11,070,625 | B2 | 7/2021 | Brooks |
| 2002/0152310 | A1 | 10/2002 | Jain |
| 2003/0046396 | A1 | 3/2003 | Richter et al. |
| 2003/0093499 | A1 | 5/2003 | Messinger et al. |
| 2004/0006578 | A1 | 1/2004 | Yu |
| 2004/0047354 | A1 | 3/2004 | Slater et al. |
| 2004/0199571 | A1 | 10/2004 | Spiegl et al. |
| 2005/0102121 | A1 | 5/2005 | Odhner et al. |
| 2005/0187957 | A1 | 8/2005 | Kramer |
| 2006/0064496 | A1 | 3/2006 | Anderson et al. |
| 2008/0049616 | A1 | 2/2008 | Kamath et al. |
| 2009/0024991 | A1 | 1/2009 | Campbell |
| 2010/0274922 | A1 | 10/2010 | Reavely |
| 2010/0306353 | A1 | 12/2010 | Briscoe et al. |
| 2011/0304634 | A1 | 12/2011 | Urbach |
| 2012/0084838 | A1 | 4/2012 | Inforzato |
| 2012/0110595 | A1 | 5/2012 | Reitman |
| 2012/0131163 | A1 | 5/2012 | Ganapathi et al. |
| 2012/0185586 | A1 | 7/2012 | Olshansky |
| 2012/0263076 | A1 | 10/2012 | Zhao |
| 2012/0303800 | A1 | 11/2012 | Maldaner |
| 2012/0331127 | A1 | 12/2012 | Wang |
| 2013/0166092 | A1 | 6/2013 | Wang |
| 2013/0173756 | A1 | 7/2013 | Luna et al. |
| 2013/0242984 | A1 | 9/2013 | Lee |
| 2014/0372397 | A1 | 12/2014 | Gocek et al. |
| 2015/0156133 | A1 | 6/2015 | Leitch et al. |
| 2015/0199218 | A1 | 7/2015 | Wilson |
| 2016/0087933 | A1 | 3/2016 | Johnson |
| 2016/0173584 | A1 | 6/2016 | Fitzpatrick |
| 2016/0352867 | A1 | 12/2016 | Subbarayan |
| 2017/0223593 | A1 | 8/2017 | Koodli |
| 2018/0020048 | A1 | 1/2018 | Seol |
| 2018/0034692 | A1 | 2/2018 | Brooks |
| 2018/0034917 | A1 | 2/2018 | Brooks |
| 2018/0097707 | A1 | 4/2018 | Wright et al. |
| 2018/0205799 | A1 | 7/2018 | Brooks |
| 2018/0295065 | A1 | 10/2018 | Adams |
| 2019/0037026 | A1 | 1/2019 | Brooks et al. |
| 2019/0037027 | A1 | 1/2019 | Brooks et al. |
| 2020/0014704 | A1 | 1/2020 | Kumar |
| 2020/0074323 | A1 | 3/2020 | Martin |
| 2020/0177682 | A1 | 6/2020 | Brooks |

OTHER PUBLICATIONS

Author Unknown. "Best practices for developing with Microsoft Dynamics CRM" Dynamics CRM 2016, Dynamics CRM Online. Sep. 13, 2016. Eleven pages. <https://msdn.microsoft.com/en-us/library/gg509027.aspx>.

Author Unknown. "Methods and Formulas Used to Determine Server Capacity", © 2018 Microsoft, 4 pages, <https://technet.microsoft.com/en-us/library/cc181325.aspx>.

Author Unknown. "Server-connection channel limits", IBM Knowledge Center, last printed Jun. 5, 2018, 2 pages, <https://www.ibm.com/support/knowledgecenter/en/SSFKSJ_9.0.0/com.ibm.mq.con.doc/q015640_.htm>.

Author Unknown. "Set a limit on the number of client connections", Citrix Product Documentation, Sep. 14, 2018, 1 page, <https://docs.citrix.com/en-us/netscaler/12/load-balancing/load-balancing-advanced-settings/set-limit-on-max-client.html>.

Deshmukh, et al. "Applying Load Balancing: A Dynamic Approach" vol. 2, Issue 6, Jun. 2012. International Journal of Advanced Research in Computer Science and Software Engineering. pp. 201-206.

Jia-Hong Chang;Hui-Sheng Cheng; Mei-Ling Chiang. Design and Implementation of Scalable and Load-Balanced Virtual Machine Clusters. 2017 IEEE 7th International Symposium on Cloud and Service Computing (SC2). Year: 2017 Conference Paper Publisher: IEEE (Year: 2017).

Lee, "Supporting server-level fault tolerance in concurrent-push-based parallel video servers," IEEE Transactions on Circuits and Systems for Video Technology (Year: 2001).

List of IBM Patents or Patent Applications Treated as Related. (2022) 2 pages.

Mell et al., "The NIST Definition of Cloud Computing", National Institute of Standards and Technology, Special Publication 800-145, Sep. 2011, 7 pages.

Shu Sekigawa. 2019. Expected Capacity Guaranteed Routing based on Dynamic Link Failure Prediction. International Conference on Computing, Networking and Communications (ICNC) Publisher: IEEE (Year: 2019).

Zhu et al., "Improved dynamic load balancing algorithm based on Least-Connection Scheduling," 2018 IEEE 4th Information Technology and Mechatronics Engineering Conference (ITOEC), 2018, pp. 1858-1862.

* cited by examiner

DYNAMIC CONNECTION CAPACITY MANAGEMENT

BACKGROUND

The present disclosure relates to the management of connections for the communication of data between clients and a server and, more particularly, to the dynamic management of the capacity of long-lived connections in response to connection changes.

A data processing system operating as a server receives work from its clients over connections. Typically, a request for work from a client is sent to the server over a connection, the server processes the work and sends a response to the client over the connection. Such a communication exchange between the client and server for an individual item of work may be called a "conversation." In some server applications, such as transaction processing systems, large volumes of work can be processed for multiple clients concurrently, where each client can send multiple concurrent requests, some or all of which require processing by the server. In such applications, each connection may be configured to support concurrent conversations with a client over a prolonged period of time. Thus, each connection is "long-lived" in the sense that it remains active (i.e., in service) for multiple conversations between the client and server. Furthermore, such long-lived connections often support multiple concurrent requests from the client to the server. When a connection is added to the server (e.g., upon system start-up/restart or when system changes are made), the new connection can be configured with an upper capacity limit indicating the maximum number of concurrent requests it can support from the client. Conventionally, this capacity for a connection is configured manually by a system administrator and persists until the connection is closed.

The ability of a server to carry out work from its clients is limited by its resources, including the processing, memory, and communication resources available for use by the server. Thus, the server has a finite capacity to process concurrent requests for its clients. It is difficult for the system administrator to configure the capacity limit for a new connection, so as to avoid the risk of server errors (e.g., stalling) due to work overload and/or resource shortages at the server, while, at the same time, efficiently utilizing resources (e.g., by optimizing the number of conversations that can be supported by the connection, and/or the number of requests processed by the server as a whole, at a given time).

SUMMARY

Aspects of the present disclosure automatically configure the capacity of connections. In some aspects, the capacity of connections is automatically determined upon system startup or restart. In other aspects, the capacity of connections is dynamically determined in response to changes in the connections, such as addition of a connection or removal of a connection.

According to aspects of the present disclosure, a computer implemented method is provided. The method includes receiving a request to change a first connection to a server and determining active connections to the server. The method also includes determining a corresponding current capacity of each active connection and determining a new capacity for the first connection and the active connections to the server. The method further includes determining that a spare capacity of the server is insufficient for the first connection. The method also includes allocating a capacity to the first connection based on the request. The method further includes adjusting the current capacity of the active connections, including reducing the current capacity of at least a portion of the active connections in proportion to the respective current capacity of the one or more active connections.

Thus, the method dynamically configures the capacity of connections to a server, in response to changes in connections, without the need for manual intervention. The dynamic configuration takes into account the server's total capacity and the capacities of the active connections, so as to minimize the risk of overloading the server while optimizing (e.g., maximizing) the capacity and/or utilization of connection and server resources.

Example implementations of the method determine a new capacity for each connection to the server further using an algorithm that provides a fair allocation of the total capacity to each connection based on one or more parameters associated with the respective client connection. For instance, allocation may be based on parameters such as client priority, requested capacity, historical usage, ongoing demand, and the like.

In one aspect, the method dynamically configures the capacity of connections to a server, in response to a request to add a new connection. In some example implementations, the request is a request to add the first connection to a server and the request specifies a requested capacity for the first connection. The method determines a new capacity for each connection to the server based on the requested capacity for the connection, the total server capacity and the current capacities of the active connections.

Thus, the method dynamically configures the capacity of the new connection and one or more of the existing connections to a server, in response to the addition of a connection. Thus, it is possible to add the new connection, without manual intervention, so as to minimize the risk of server errors while optimizing (e.g., maximizing) the capacity and/or utilization of the new and existing connection and server resources.

In some example implementations of the above aspect, the method includes determining a spare capacity of the server based on the total capacity and the current capacities of the active connections and calculates the new capacity for one or more connections based on the request and the spare capacity. For example, if the spare capacity of the server is sufficient for the new connection, the method allocates a capacity to the first connection based on the request and leaves the capacity of the active connections unchanged. If the spare capacity of the server is insufficient for the first connection, the method allocates a capacity to the first connection based on the request and determines the new capacity for one or more of the active connections including reducing the current capacity of one or more of the active connections. In this way, the allocation of capacity to the new connection is based on the availability of server resource, so as to prevent server errors, while, as far as possible, meeting the client needs indicated in the request.

Various techniques can be used to reduce the capacity of active connections. In some example implementations, the capacity of one or more active connections is reduced based on an amount of capacity required to enable allocation of the capacity to the new connection. In some example implementations, the capacity of one or more active connections is reduced further based on one or more of: current capacity of the respective connection; requested capacity of the respective connection; or renegotiation capability of the respective connection.

In another aspect, the method dynamically configures the capacity of connections to a server, in response to the request being a request to remove a connection. In some example implementations, the method receives a request to remove a connection and the request identifies the connection to be removed. The method determines the new capacity for one or more active connections to the server including determining an increased capacity for one or more of the active connections.

Thus, the method dynamically configures the capacity of the remaining connections, in response to the removal of a connection. Thus, it is possible to remove a connection and reconfigure the remaining connections, without manual intervention, so as to optimize (e.g., maximizing) the capacity and/or utilization of the connections and server resources.

In some example implementations, the method determines an amount of capacity of the server for reallocation to the one or more active connections based on a current capacity of the connection to be removed. In some example implementations, the method increases the capacity of one or more remaining active connections based on the determined amount of capacity of the server for reallocation. In the same or other example implementations, the method increases the capacity of one or more remaining active connections based on one or more of: current capacity of the connection; requested capacity of the connection; or renegotiation capability of the connection.

In another aspect, the method automatically and dynamically configures the capacity of connections during start-up or restart of a server. In some example implementations, the method includes receiving a request to add a first connection to a server as part of a start-up procedure of the server. The server has a total capacity to process multiple concurrent requests from one or more clients over respective connections, and connections to the server are configured with a capacity for communicating concurrent client requests. The method also includes determining a capacity for the first connection to the server based on the request and the total capacity. The method further includes receiving one or more requests to add one or more further connections to the server as part of the start-up procedure. The method also includes determining, for each request to add one or more further connections, one or more existing connections to the server and corresponding current capacities for each existing connection. The method further includes determining, for each request of the one or more requests to add one or more further connections, a new capacity for the one or more further connections and for each existing connection to the server based on the request, the total capacity, and the current capacities of the existing connections. The method also includes determining that a spare capacity of the server is insufficient for the one or more further connections and allocating a capacity to the first connection based on each request of the one or more requests. The method further includes adjusting the current capacity of one or more of the one or more existing connections, including reducing the current capacity of at least a portion of the one or more existing connections in proportion to the respective current capacity of the at least a portion of the one or more existing connections.

Thus, the method automatically configures the capacity of connections, without manual intervention, as they are added during the start-up procedure, and dynamically reconfigures them, as necessary, so as to optimize (e.g., maximize) the capacity and/or utilization of the connections and server resources.

In some example implementations, the method determines the new capacity for the one or more second connections and for each existing connection to the server using an algorithm that provides a fair allocation of the total capacity to each of the connections based on parameters associated with the respective connection. For instance, allocation may be based on parameters such as client priority, requested capacity, historical usage, ongoing demand and the like. In the case that the start-up procedure is a system restart, such parameters may include historical data parameters relating to the historical capacity or usage of the corresponding connection.

In example implementations, in response to a request to add a further connection, the method may use techniques equivalent to the above aspect, in which the method dynamically configures the capacity of connections to a server, in response to a request to add a new connection.

In some example implementations of the above aspects, the method notifies a client associated with a connection of a determined new capacity of the connection to the server.

In the same or other example implementations of the above aspects, the method updates a record of the connections to the server with the determined new capacity of connections to the server.

According to another aspect of the present disclosure, a system is provided. The system comprises a processor associated with a server. The processor is configured to perform the method according to one or more of the above aspects of the present disclosure.

In example implementations, the system comprises a connection capacity controller in communication with a connection manager and a database. The system further comprises a server capacity manager in communication with the database. The connection capacity controller is configured to automatically configure the capacity of connections to the server, in accordance with aspect of the present disclosure.

According to yet another aspect of the present disclosure, a computer program product is provided. The computer program product comprises a computer readable storage medium having program instructions embodied therewith. The program instructions are configured to perform the method according to one or more of the above aspects of the present disclosure.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate implementations of the present disclosure and, along with the description, serve to explain the principles of the disclosure. The drawings are only illustrative of certain implementations and do not limit the disclosure.

Figure 1A:
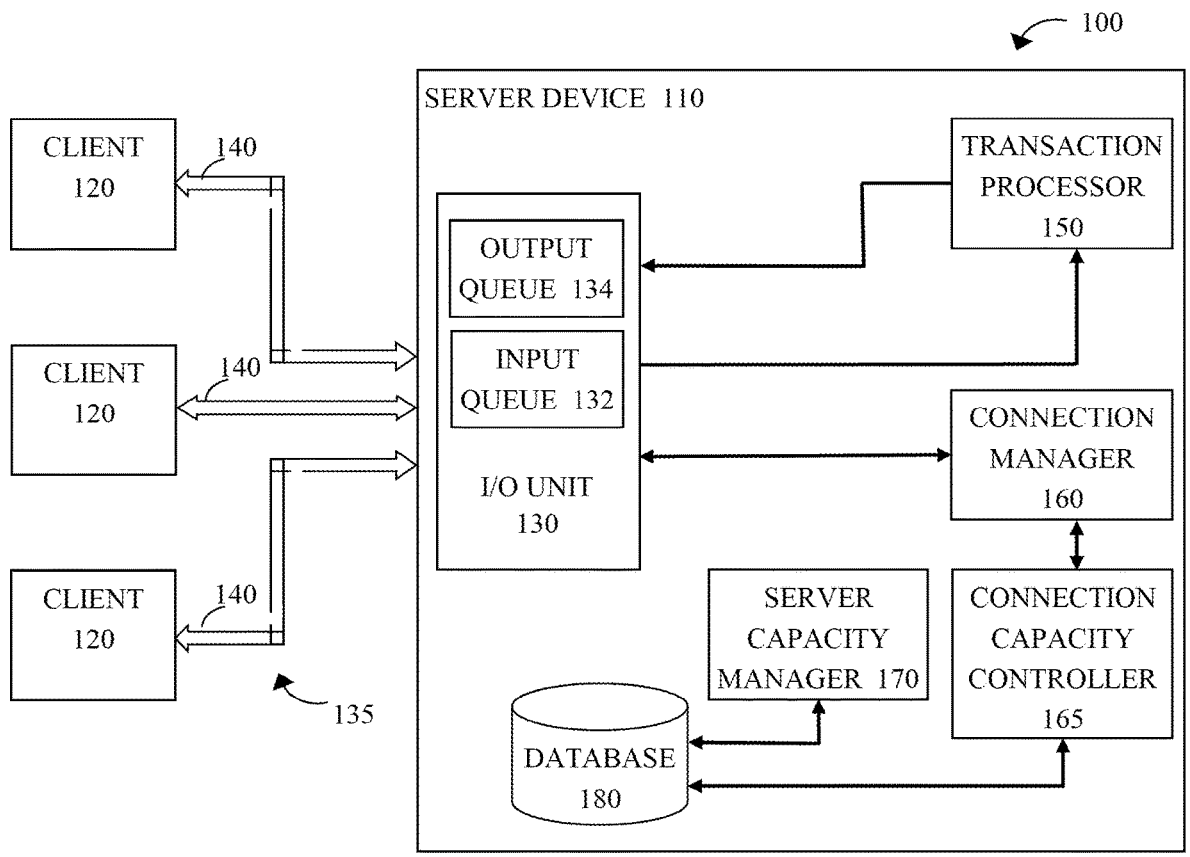
FIG. 1A is a schematic block diagram of a data processing system in accordance with example implementations of the present disclosure.

While the invention is amenable to various modifications and alternative forms, specifics thereof have been shown by way of example in the drawings and will be described in detail. It should be understood, however, that the intention is not to limit the invention to the particular implementations described. On the contrary, the intention is to cover all modifications, equivalents, and alternatives falling within the spirit and scope of the invention.

DETAILED DESCRIPTION

Servers typically receive and process requests for work from multiple clients over corresponding connections. Some server applications use long-lived connections. In contrast to short-lived connections, which are temporarily created for a short time period (e.g., less than a second) for a single conversation that relates to an individual work item for the client, long-lived connections remain active for a prolonged time period (e.g., minutes, hours, days, or longer) for multiple, often concurrent, conversations relating to different work items for a client. Such long-lived connections are typically "stateful," whereby the server maintains a record of the state of its active connections to its clients. Each connection is configured with an upper capacity limit, corresponding to the maximum number of concurrent requests (i.e., work items or conversations) it can support from the client. This capacity limit is communicated to the client and stored in a record of the connections to the server. The ability of a server to carry out work from its clients is limited by the resources available for use by the server. In particular, the resources available to the server limit the number of client requests it can process concurrently. Thus, it is desirable to configure the capacity limit of the connections so as to avoid overloading the server, while optimizing the amount of work that is concurrently performed for clients using the connections and/or the total amount of work that is concurrently performed by the server.

Conventionally, the capacity limit of a long-lived connection is configured manually by a system administrator and persists until the connection is closed. Manual configuration of a connection can be used when a connection is first added to the server. If the capacity limit of a connection is configured too low, the amount of work that can be received concurrently from the client on a connection may not be sufficient to meet the actual demand of the client. This may occur even in scenarios where spare server capacity is available, for example due to the removal of another connection from the server after the initial configuration of the connection(s). Conversely, if the capacity limit of a connection is configured too high, the connection may be underutilized by the client due to lower actual client demand. In consequence, server resources may not be efficiently utilized by the clients. Accordingly, improved techniques for automatically configuring the capacity limit of connections are desirable. Furthermore, improved techniques for dynamically configuring the capacity limit of connections, in response to changes in the connections such as the addition or removal of a connection, to more effectively utilize the server resources, is desirable.

The present disclosure provides methods, systems, and computer program products for configuring the capacity limit of one or more client connections to a server. In example implementations, the capacity limit of one or more client connections is dynamically configured in response to changes in the connections to the server. The dynamic configuration of the capacity limit of connections enables more efficient utilization of server resources without overloading the server, while, as far as possible, meeting client demand. In example implementations, the capacity limit of one or more connections is automatically configured during a start-up procedure.

In the present disclosure, unless otherwise stated, the term "connection" refers to a long-lived path through a communications network between a single client system and a server system, such as a transaction processing system. The term "task" refers to a discrete work item executing under the control of a client or server system. The term "session" refers to a portion of the connection that is used by a pair of tasks to communicate with each other, one running in the client system and the other in the server system. The term "conversation" refers to the exchange of communications (e.g., messages) between a pair of tasks over a session. The term "capacity" generally refers to the amount of resource(s) available. In example implementations, the term "connection capacity" refers to a maximum number of sessions (i.e., pairs of client-server tasks or "conversations") that are supported by the connection. In some scenarios, the "connection capacity" may also be regarded as the bandwidth of the connection. Similarly, in example implementations, the term "server capacity" refers to a total number of concurrent requests that are supported for all of its clients. Unless otherwise stated, references to changing a connection relate to adding (i.e., opening) or removing (i.e., closing) a connection.

As a person of ordinary skill in the art will appreciate, in some example implementations, a server comprises a distributed data processing system, called a "server region," that is configured to handle service requests (e.g., work items or tasks) from multiple client devices over corresponding long-lived connections. An example of such a server region is a transaction processing system such as a Customer Information Control System (CICS®) Transaction Server (TS) for the z/OS® operating system of IBM Corporation. However, the teachings of the present disclosure are equally applicable to other server applications. Furthermore, while a particular data processing system may be described as a "server" or a "client" in a particular scenario, these roles may be different in other scenarios.

FIG. 1A is a schematic block diagram of a data processing system 100 in accordance with example implementations of the present disclosure. In particular, data processing system 100 comprises a server device 110 (herein called "server") arranged for data communication with multiple client devices 120 (herein called "clients") over a data communications network 135, such as a Transmission Control Protocol/Internet Protocol (TCP/IP) network (e.g., a Local Area Network (LAN), Wide Area network (WAN) or the Internet). For simplicity, the illustrated data processing system 100 includes a single network. In other example implementations, clients are connected to the server over multiple networks, which can be different types of network (e.g., implementing different network protocols). As a person of ordinary skill in the art will appreciate, the devices and their associated functions in the illustrated system 100 are by way of example only.

Network 135 includes connections 140 between the server 110 and each client 120. For example, in the context of a TCP/IP network, connections may be established over wired links such as copper or optical fiber-based cables such as Ethernet, Digital Subscriber Line (DSL), Integrated Services Digital Network (ISDN), Fiber Distributed Data Interface (FDDI) or other type of network-compatible cable, and wireless links may be established by any form of wireless technology, whether now known or developed in the future. Each connection 140 is a long-lived communication path between the respective client 120 and the server 110. Each connection 140 has communication capacity (i.e., bandwidth) to support multiple sessions, so that multiple concurrent conversations (request and response messages for a task) are supported by the connection.

In the illustrated example implementation, each client 120 can send a request as a data communication (e.g., request message) over its connection 140 to the server 110. In response to receiving and processing the request, the server 110 can send a response as a data communication (e.g., response message) over the same connection 140 to the client 120. In example implementations, the requests and responses can each comprise one or more network packets (e.g., TCP/IP packets) of standard or predetermined form, having inter alia a header containing control information and a payload containing data. The header can include source and destination addresses and packet length, indicative of the amount of data contained in the payload (e.g., in bytes).

Server 110 generally includes, or has access to, memory, processing, and communications resources for handling client requests. In particular, server 110 utilizes memory and processing resources to store and process data relating to a client request and the response thereto. In example implementations, server 110 includes a transaction processor 150 configured to utilize memory and processing resources for processing multiple concurrent requests from clients 120. Communications resources can include any suitable network interface for enabling communication of data (i.e., requests and responses) over connections 140 to and from clients 120 in accordance with the protocol of network 135.

In the illustrated example implementation, server 110 includes an input/output (I/O) unit 130. I/O unit 130 includes input queue 132 for queuing input request messages received from clients 120, and output queue 134 for queuing output response messages to be sent to clients 120. A transaction processor 150 receives and processes requests from clients 120 via input queue 132 of I/O unit 130 and sends responses to the respective clients 120 via output queue 134 of I/O unit 130.

Server 110 further includes a connection manager 160, a connection capacity controller 165, a server capacity manager 170, and a database 180. Connection manager 160 manages connections 140 for data communications to and from the server 110. In particular, connection manager 160 handles requests to add and remove connections 140 and maintains a server connections record 182 (see FIG. 1B) of the connections 140 in database 180.

Server capacity manager 170 manages the capacity of the server, which also can change over time. In example implementations, server capacity manager 170 determines a total capacity of the server to process concurrent requests, based on the available memory, communication, and processing resources. Server capacity manager 170 stores the total capacity of the server 110 in a server capacity record 184 (see FIG. 1B) in database 180.

Connection capacity controller 165 controls the capacity of the connections, in accordance with the present disclosure. In particular, in example implementations, connection capacity controller 165 receives an indication of a request to change a connection 140 (e.g., to add or remove a connection 140) from the connection manager 160. In response, connection capacity controller 165 configures the capacity of the connections 140, based on the request, the total server capacity, and the capacity of the connections 140 stored in database 180, in accordance with the methods described below. Thus, connection capacity controller 165 is able to automatically configure the capacity of connections, for instance as part of a start-up procedure as connections are added or dynamically in response to connection changes.

Figure 1B:
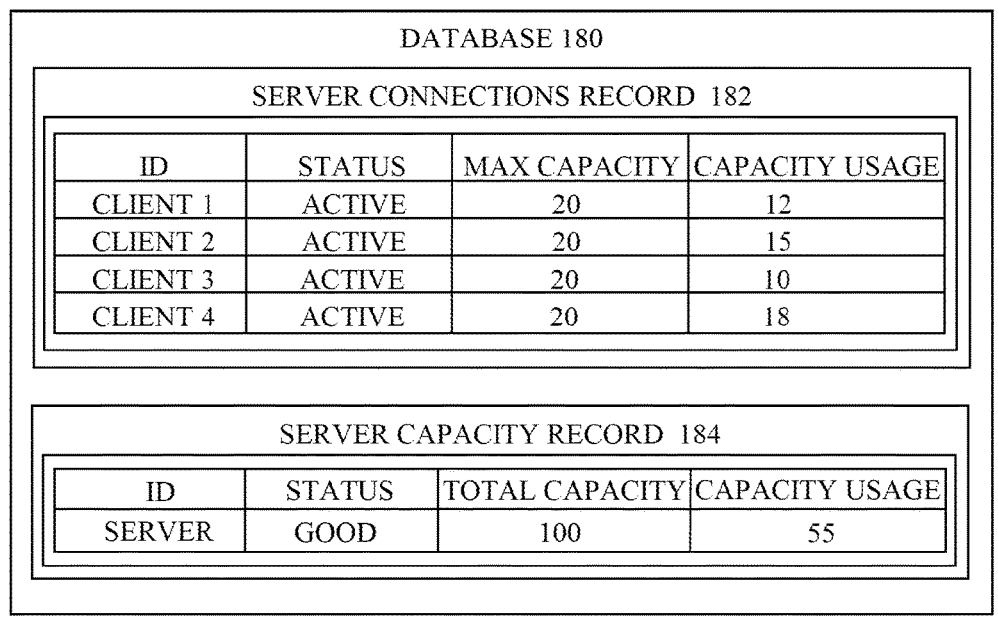
FIG. 1B illustrates an example database used by a server in accordance with example implementations of the present disclosure.

FIG. 1B illustrates an example database 180 in accordance with example implementations of the present disclosure. Database 180 of FIG. 1B can be the same database 180 of FIG. 1A. Database 180 can contain connections record 182, server capacity record 184, and any other data used by server 110 of FIG. 1A.

In example implementations, the server connections record 182 includes, for each connection: an identifier (ID); a status (STATUS); a capacity (MAX CAPACITY), and, optionally, a capacity usage (CAPACITY USAGE) such as a high-water mark for usage of the connection over a time period. As a person of ordinary skill in the art will appreciate, in other example implementations, the server connections record 182 includes other fixed and/or variable parameters of the connections. The identifier of the connection uniquely identifies a connection and does not change over time. For instance, the connection identifier can comprise an identifier of the client. However, the status, capacity, and capacity usage of a connection can change over time. The status (e.g., active or inactive), is controlled by the connection manager 160, while the capacity and capacity usage of a connection are controlled by the connection capacity controller 165 as described above. While the server connections record 182 of FIG. 1B shows a max capacity of 20 for each client, the number 20 is not to be read as limiting, nor are implementations of this disclosure limited to scenarios where the max capacity of each client device is the same number.

In example implementations, the server capacity record 184 includes: an identifier (ID); a status (STATUS); a total capacity (TOTAL CAPACITY), and, optionally, a capacity usage (CAPACITY USAGE) such as a high-water mark of capacity usage of the server. As a person of ordinary skill in the art will appreciate, in other example implementations, the server capacity record 184 includes other fixed and/or variable parameters of the server. Server capacity manager 170 can use any suitable technique for determining the total capacity of the server 110. Such techniques are known in the art and are not described herein.

Figure 2:
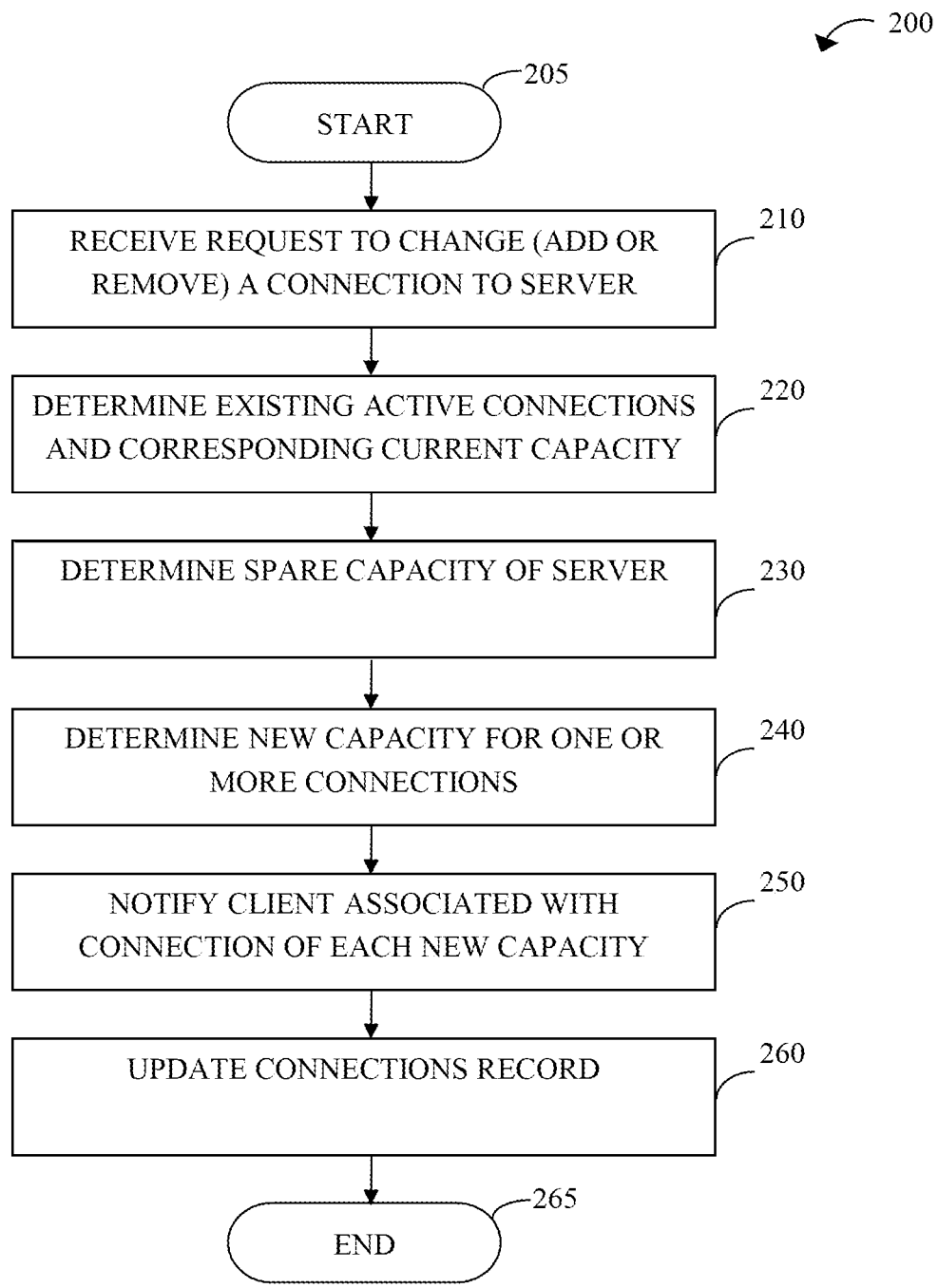
FIG. 2 is a flowchart of an example method for configuring the capacity of connections to a server, in accordance with some implementations of the present disclosure.

FIG. 2 is a flowchart of an example method 200 for configuring the capacity of connections to a server, in accordance with some implementations of the present disclosure. In particular, the method 200 controls the capacity (e.g., bandwidth) of client connections to a server system, such as a transaction processing system, so as to avoid overloading the server, while efficiently utilizing the connections and/or available server resources, in response to changes in client connections. Such changes may include the addition of client connections during system start-up or the addition or removal of client connections during operation of the server. In example implementations, method 200 can be performed by the connection capacity controller 165 described above with reference to FIG. 1A. In accordance with FIG. 1A and the components depicted therein, the connection capacity controller 165 may comprise an agent, module, sub-system (or a part thereof) associated with the server 110, for managing the capacity of connections 140 between the server 110 and its clients 120. In other implementations, method 200 can be performed by a computer, including a server computer, using any components suitable to perform the method. While method 200 will be discussed herein as being performed by a capacity controller, it is not limited to such implementations.

Method 200 starts at block 205. At block 210, a capacity controller receives a request to change a connection to the server. For example, in one scenario, at block 210 a capacity controller can receive a request to add a new connection with a particular capacity, for instance for a new client. In another scenario, at block 210 a capacity controller can receive a request to remove an identified existing connection. In example implementations, the request to change one or more connections may be a message, signal, or other indicator received. For example, the request can be from the connection manager 160 associated with the server 110 as shown in FIG. 1A, in response to an event for opening or closing a connection 140. In other example implementations, the request may be received from another part of the server, the client device, or otherwise.

At block 220, the capacity controller determines the existing active connections and corresponding current capacity. In particular, in the illustrated method, the capacity controller at 220 reviews a record of connections to the server in data storage associated with the server to identify the active connections and their corresponding current capacities (i.e., configured capacity limits). In example implementations, the record may correspond to server connections record 182 shown in FIG. 1B, comprising for each connection: an identifier (ID); a status (STATUS), and a capacity (MAX CAPACITY). In example implementations in which the server is a transaction processing system, the current capacity can indicate that a maximum number of sessions are supported by the connection, and, thus, the number of work items from the client that can be communicated concurrently using the connection.

At block 230, the capacity controller determines the spare capacity of the server. As discussed above, due to limited resources available to the server, the total capacity of the server to process concurrent client requests is finite and predetermined. In example implementations, the total capacity of the server may be determined by server capacity manager 170 and stored in server capacity record 154 as shown in FIGS. 1A and 1B. Thus, in scenarios in which the request is to add a connection, the capacity controller at block 230 calculates the spare capacity by subtracting the sum of the current capacities of the existing active connections from the total capacity of the server. In scenarios in which that the request is to remove a connection, block 230 calculates the spare capacity by subtracting the sum of the current capacities of the remaining active connections, which remain after the particular connection is removed, from the total capacity of the server. In example implementations in which the server is a transaction processing system, the total capacity of the server can correspond to the maximum number of tasks that can be handled concurrently by the server, and the spare capacity thus corresponds to the number of tasks that the server can handle that are not currently allocated for an active connection.

At block 240, the capacity controller determines a new capacity for one or more connections. In scenarios in which the request is to add a connection, the capacity controller determines a capacity of at least the new connection and, optionally, one or more of the existing active connections. In scenarios in which the request is to remove a connection, the capacity controller optionally determines a capacity for one or more of the remaining active connections. In particular, the capacity controller determines the capacity for each respective connection based on the request, the total server capacity, and the determined current capacities of the existing active connections. In the illustrated example implementation, the capacity controller determines the capacity for each respective connection based on one or more of: the spare capacity determined in block 230, the request, such as the particular capacity indicated in the request, and one or more other parameters according to application requirements. In accordance with example implementations, any suitable method, procedure, or algorithm for determining the capacities for connections may be used in block 240. The method may involve other factors or parameters, including the historical configured capacity and/or usage of connections, the extent to which negotiation of the capacity of connections with clients is possible, and other suitable considerations. Examples of other factors or parameters are described in more detail below.

At block 250, the capacity controller notifies clients associated with each connection, which have had its capacity changed in block 240, of its new capacity. At block 260, the capacity controller updates the record of the connections to the server with the new capacities for the connection. In scenarios in which a new connection is added, the connections record is updated to include a data record for the new connection. The method then ends at block 265.

As a person of ordinary skill in the art will appreciate, it may not be necessary to determine the spare capacity of the server. Thus, in other example implementations, block 230 can be omitted. Nevertheless, the capacity controller at block 240 determines the new capacity of one or more connections using the server capacity and the capacities of the existing active connections, for the dynamic configuration of the capacities of connections based on the requested change.

In accordance with the method 200 of FIG. 2, the capacity of one or more active connections is dynamically adjusted in order to improve the efficiency of utilization of server resources, while avoiding the risk of overloading the server and consequent server errors.

Figure 3:
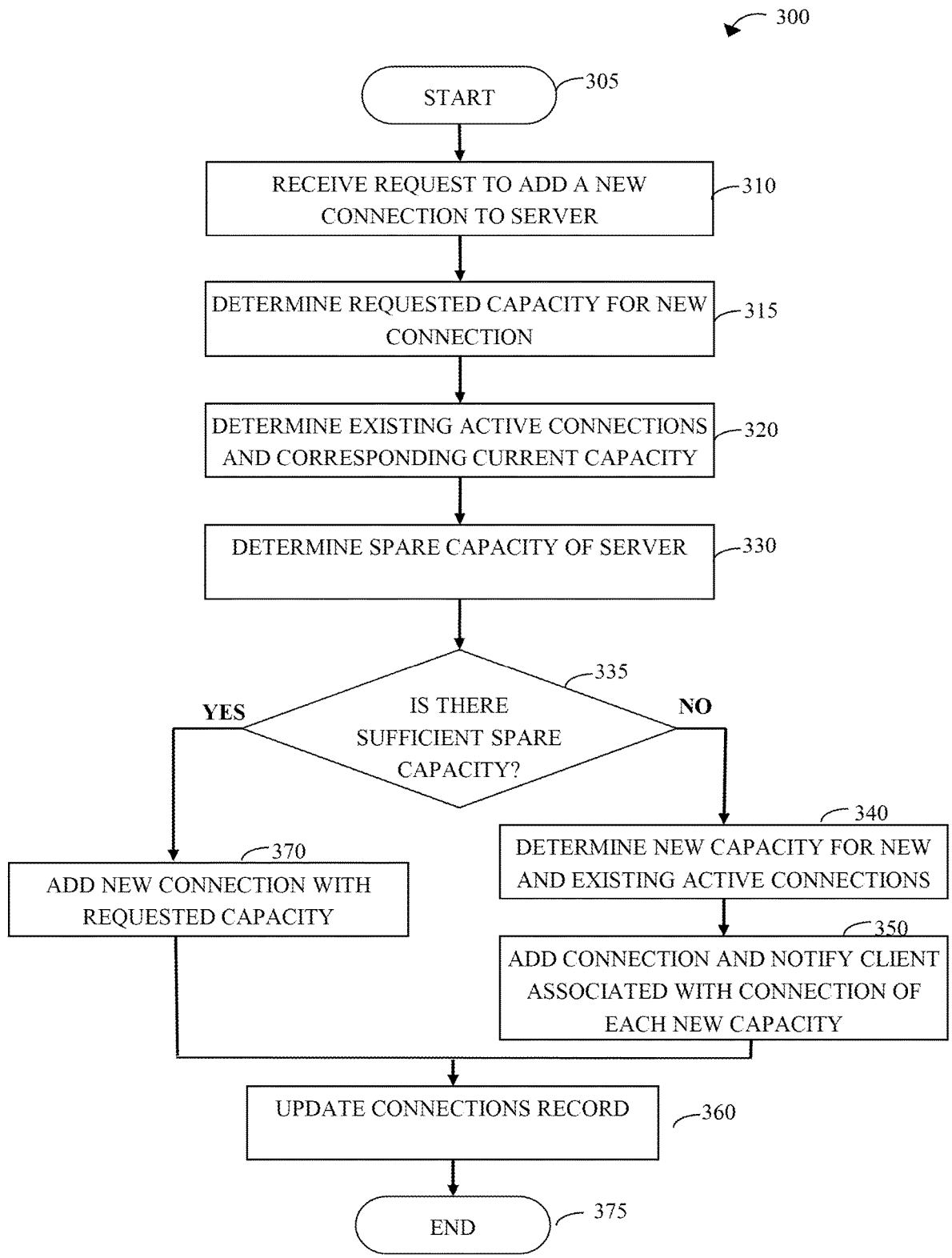
FIG. 3 is a flowchart of an example method for dynamically configuring the capacity of connections to a server in response to a request to add a new connection, in accordance with some implementations of the present disclosure.

FIG. 3 is a flowchart of an example method 300 for dynamically configuring the capacity of connections to a server in response to a request to add a connection, in accordance with some implementations of the present disclosure. The method 300 of FIG. 3 dynamically controls the capacity (e.g., bandwidth) of the new connection and, optionally, existing active connections to a server system, such as a transaction processing system, so as to avoid overloading the server, while efficiently utilizing the connections and/or available server resources. In example implementations, method 300 is performed by the connection capacity controller 165 described above with reference to FIG. 1A. In other implementations, method 300 can be performed by a computer, including a server computer, using any components suitable to perform the method. While method will be discussed herein as being performed by a capacity controller, it is not limited to such implementations.

The method 300 starts at block 305. While FIG. 3 includes a start and end for method 300, it can operate continually during operation of a server after system start-up by returning to start 305 after reaching end 375. At block 310, the capacity controller receives a request to add a new connection with a particular capacity to the server, for example for a new client. In example implementations, the request to add a connection may be a message, signal, or other indicator, specifying a requested capacity for the new connection, received from another part of the server (such as the connection manager 160 of the server 110 of FIG. 1A), in response to an event for opening a new connection, or otherwise.

At block 320, the capacity controller determines the active connections and corresponding current capacity. In particular, in the illustrated method, the capacity controller reviews a record of connections to the server in data storage associated with the server to identify the existing active connections and associated current capacity, as in block 220 of the method 200 of FIG. 2.

At block 330, the capacity controller determines the spare capacity of the server. In particular, the capacity controller calculates the spare capacity by subtracting the sum of the current capacities of the existing active connections from the total capacity of the server. In example implementations in which the server is a transaction processing system, the total capacity of the server can correspond to a maximum number of tasks that can be handled concurrently by the server, and the spare capacity thus corresponds to the number of tasks that the server can handle concurrently that are not currently allocated for an active connection.

At block 335, the capacity controller determines whether the server has sufficient spare capacity to add the connection. In example implementations, the amount of spare capacity sufficient to add the connection may be the requested capacity, a fixed or variable proportion of the requested capacity, or a minimum capacity for a connection, according to application requirements. In an example implementation, at block 335 the capacity controller can determine that there is sufficient spare capacity if the determined spare capacity is greater than or equal to the requested capacity. If at block 335 the capacity controller determines that the server does not have sufficient spare capacity to add the connection, the method proceeds to block 340.

At block 340, the capacity controller determines the capacity for the new connection and, optionally, for one or more of the existing active connections. The capacity controller determines the capacity for each respective connection based on the request, the total server capacity, and the determined current capacities for the existing active connections. In particular, the capacity controller determines the capacity for the new connection and one or more of the existing active connections based on the requested capacity, the determined spare capacity, and the determined current capacities of the existing active connections. In example implementations, the capacity controller can determine the capacity for the new connection and one or more of the existing active connections using a method, technique, or algorithm that provides a fair allocation of the total available server capacity to each of the connections, by taking into account factors or parameters associated with the connections and/or corresponding clients, such as client priority, requested capacity, historical connection capacity or usage, ongoing demand, and the like.

In some example implementations, at block 340 the capacity controller implements an algorithm comprising the steps: (i) determining a capacity for the new connection based on a fixed or variable proportion of the requested capacity, (ii) determining whether the spare capacity of the server is sufficient to provide the capacity and, if not, determining the capacity shortfall, and (iii) if there is a capacity shortfall, reducing the capacity of each of the existing active connections in proportion to their current capacities so as to provide the capacity shortfall. Thus, in an example scenario, a server has a total capacity of 100 concurrent tasks and has four active connections, each with a current capacity of 20 sessions (i.e., each allowing up to 20 concurrent tasks). A new connection request is received, asking for a capacity of 50 sessions. In accordance with the algorithm, the capacity of the new connection is calculated as 80% of the requested capacity, i.e., 40 sessions (step (i)). Since the spare capacity of the server is 20 sessions, there is a shortfall of 20 sessions (step (ii)). The algorithm reduces the current capacity of each connection in proportion to its existing capacity to obtain the capacity shortfall. Accordingly, the capacity of each of the four existing active connections is reduced by 5 sessions from 20 to 15 sessions (step (iii)).

In other example implementations, the capacity controller at block 340 can implement an algorithm that weights the capacities of connections based on parameters associated with the connections. Such parameters include: the priorities of the clients/associated connections; the capacity requested when setting up the connections; historical or actual capacity or capacity utilization of the connections, and the like. For example, the algorithm allocates more capacity (e.g., sessions) to connections for higher priority clients than those of lower priority clients. Thus, in the above example, if two of the existing active connections have a high priority, then the shortfall may be obtained by only reducing the capacity of the two, lower priority connections. In this case, the algorithm gives the new connection 40 sessions (step (i)), the existing two high priority connections each retain 20 sessions, and the existing two lower priority connections have their capacity reduced from 20 to 10 sessions (step (iii)) to provide the shortfall of 20 sessions (step (ii)). In another example, the algorithm may only allocate capacity to a connection up to the originally requested capacity for the connection. In yet another example, the algorithm may allocate capacity to connections based on actual or historical capacity or capacity utilization. For instance, the algorithm may consider capacity usage (e.g., high water mark usage), or actual or historical usage over a time period, in relation to the current capacity, and allocate more capacity to connections having a higher utilization of the capacity. Thus, for example, a connection that has a high water mark usage of 90-100% of the current capacity may be allocated more capacity than a connection that has a high water mark usage of 10-20% of the current capacity. As a person of ordinary skill in the art will appreciate, other suitable algorithms, methods, or techniques for determining a fair allocation of server resources to respective new and existing active connections, are possible according to application, user, and other requirements. All such suitable algorithms are contemplated by the present disclosure.

In some example implementations, prior to determining the capacity of the new and one or more existing active connections, the capacity controller at block 340 considers the negotiation capabilities of the clients associated with the existing active connections. In particular, some clients may communicate requests to the server using communication protocols that do not provide for renegotiation of the capacity of a connection following the initial configuration. In scenarios in which one or more clients are not capable of renegotiating the capacity of their connections, the capacity of the corresponding connections can remain unchanged and these connections can be excluded from the algorithm to determine the capacities of other existing active connections.

In other example implementations or in some scenarios, the capacity controller at block 340 can implement an algorithm that allocates the available spare capacity to the new connection and leaves the capacities of the existing active connections unchanged.

Some example implementations may employ different algorithms according to the circumstances, for instance based on parameters associated with the server (e.g., current state, current loading), parameters associated with the client devices (e.g., workload/demand, priority, whether the capacity can be adjusted by negotiation or otherwise) and/or parameters associated with the connection (e.g., existing capacity).

At block 350, the capacity controller adds the new connection with the determined capacity and, where appropriate, notifies clients of the new capacity of their corresponding connections, as in block 250 of the method 200 of FIG. 2. At block 360, the capacity controller updates the record of the connections to the server. In particular, the capacity controller updates the connections record to identify the new connection as an active connection and indicate its corresponding capacity in the connections record, and it updates the capacities for the one or more existing connections with new capacities. The method then ends at block 375.

Returning to block 335, if it is determined that the server does have sufficient spare capacity to add the connection, for example with the requested capacity, the method proceeds to block 370. At block 370, the capacity controller adds the new connection with the requested capacity. At block 360, the capacity controller then updates the record of the connections to the server. In particular, the capacity controller updates the connections record to identify the new connection as an active connection and to indicate its capacity. The method then ends at block 375.

In example implementations, blocks 330, 335 and 370 of the method 300 of FIG. 3 may be omitted, and the capacities for the new and one or more existing active connections may be determined in block 340 irrespective of the existence and/or amount of spare capacity of the server.

Figure 4:
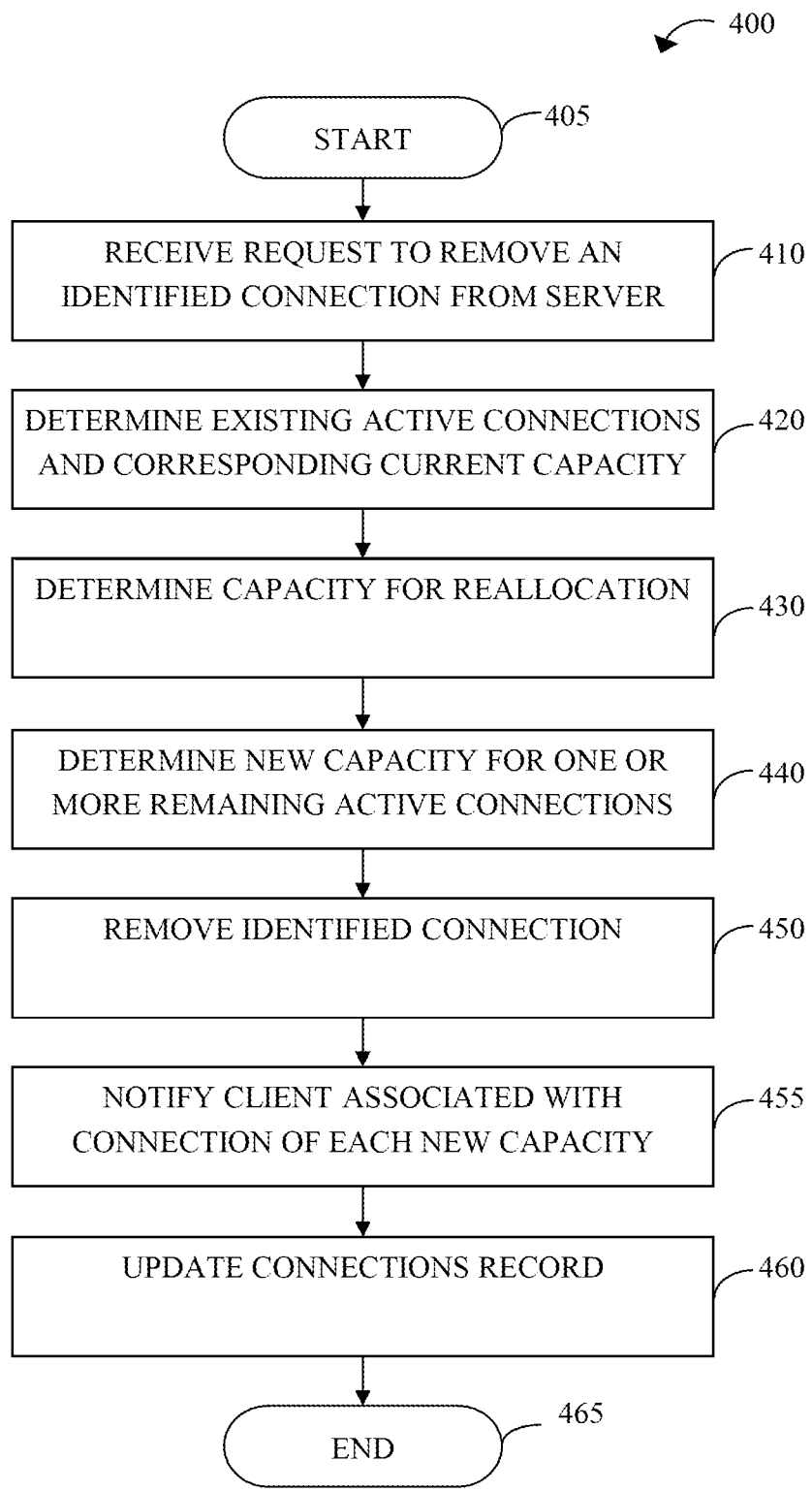
FIG. 4 is a flowchart of an example method for dynamically configuring the capacity of connections to a server in response to a request to remove an existing connection, in accordance with some implementations of the present disclosure.

FIG. 4 is a flowchart of an example method 400 for dynamically configuring the capacity of connections to a server in response to a request to remove an existing connection, in accordance with some implementations of the present disclosure. The method 400 of FIG. 4 dynamically controls the capacity (e.g., bandwidth) of the existing active connections to a server system, such as a transaction processing system, so as to avoid overloading the server, while efficiently utilizing the connections and/or available server resources. In example implementations, method 400 can be performed by the connection capacity controller 165 described above with reference to FIG. 1A. In other implementations, method 400 can be performed by a computer, including a server computer, using any components suitable to perform the method. While method will be discussed herein as being performed by a capacity controller, it is not limited to such implementations.

The method 400 starts at block 405. While FIG. 4 includes a start and end for method 400, it can operate continually during operation of a server after system start-up by returning to start 405 after reaching end 465. At block 410, the capacity controller receives a request to remove an identified connection to the server. In example implementations, the request to remove a connection may be a message, signal, or other indicator, identifying the connection to be removed, for example received from the connection manager 160 of the server 110 of FIG. 1A, in response to an event for closing a connection. In other example implementations, the request may be received from another part of the server, the client device, or otherwise.

At block 420, the capacity controller determines the existing active connections, including the connection to be removed, and corresponding current capacity. In particular, in the illustrated method, the capacity controller can review a record of connections to the server in data storage associated with the server to identify the existing active connections and corresponding current capacities, as in block 220 of the method 200 of FIG. 2.

At block 430, the capacity controller determines the capacity of the server for reallocation. In the illustrated method, the capacity of the server for reallocation can be the amount of capacity made available by removal of the identified connection. The capacity controller can calculate the capacity made available (herein called "available capacity") by subtracting the sum of the capacities of the active connections remaining, after the identified connection is removed, from the total capacity of the server. In example implementations in which the server is a transaction processing system, the total capacity of the server can correspond to a maximum number of tasks that can be handled concurrently by the server, and the available capacity for reallocation thus corresponds to the number of tasks that the server can handle concurrently that will not be allocated for an active connection, based on the current capacities of the existing connections, after the identified connection is removed.

At block 440, the capacity controller determines the new capacities for one or more of the active connections remaining after the identified connection is removed. At block 440 the capacity controller can determine new capacities for one or more of the remaining active connections based on the request, the determined available capacity, and the capacities of the existing active connections. In some implementations, the capacity controller can determine the new capacities for the one or more remaining active connections additionally based on one or more of: the originally requested capacity of the connections, the originally negotiated capacity of the connections, and the total server capacity. For instance, the capacity controller can determine a new capacity of a remaining active connection that does not exceed either the capacity assigned to the connection when it was first added or the originally requested capacity for the connection. In example implementations, the capacity controller can determine the new capacities for one or more of the remaining active connections using a method, technique, or algorithm that provides a fair allocation of the total server capacity, in particular the available capacity for reallocation following removal of the identified connection, to each remaining active connection by taking into account factors or parameters associated with the corresponding clients such as client priority, requested capacity, historical usage, ongoing demand, and the like.

In example implementations, the capacity controller can implement an algorithm that reallocates a fixed or variable proportion of the capacity made available by removal of the identified connection, to the remaining connections in proportion to their existing current capacities. Thus, in an example scenario, a server has a total capacity of 140 concurrent tasks and has five active connections, one with a capacity of 40 sessions (i.e., allowing 40 concurrent tasks) and four with a capacity of 20 sessions (i.e., allowing 20 concurrent tasks). A request is received identifying one of the connections with a capacity of 20 sessions for removal. In accordance with the algorithm, 100% of the available capacity is reallocated to the remaining active connections in proportion to their existing capacities. Thus, the 20 sessions, made available by removal of the identified connection, are reallocated so that the capacity of the active connection with 40 sessions is increased by 8 sessions to 48 sessions and the capacity of each of the three other remaining active connections is increased by 4 sessions from 20 to 24 sessions. Note that, in this example, the spare capacity of the server (i.e., 20 sessions) is maintained. In other examples, a part or all of the spare capacity (if any) of the server, which is unallocated to active connections before the request is received, may be allocated to the remaining connections in block 440.

In example implementations, the capacity controller at block 440 can implement an algorithm that weights the capacities based on one or more parameters associated with the connection, as described above in relation to block 340 of the method 300 of FIG. 3. Similarly, in some example implementations, prior to determining the capacities of one or more of the remaining existing active connections, the capacity controller at block 440 can consider the negotiation capabilities of the clients associated with the existing active connections. For clients without negotiation capabilities, the capacities of the corresponding connections can remain unchanged and can be excluded from the algorithm to determine the capacities of the remaining existing active connections in block 440, as described above in relation to block 340 of the method 300 of FIG. 3. As a person of ordinary skill in the art will appreciate, other suitable methods, techniques, or algorithms for determining a fair allocation of server resources to the remaining active connections, are possible according to application, user, and other requirements. All such suitable algorithms are contemplated by the present disclosure.

At block 450 the capacity controller removes the identified connection. At block 455, the capacity controller notifies clients of the new capacity of their corresponding connections, where appropriate, as in block 250 of the method 200 of FIG. 2. At block 460, the capacity controller updates the record of the connections to the server. In particular, the capacity controller updates the record to change the status of the removed connection from active to inactive (or removes and/or archives the connection record) and updates the capacity of the one or more remaining connections with the new capacity. The method then ends at block 465.

As a person of ordinary skill in the art will appreciate, the methods described with reference to FIGS. 2, 3, and 4 are merely examples of techniques for implementing the dynamic reconfiguration of the capacity limits of connections, in response to connection changes, in accordance with the present disclosure. Various alternative approaches, and/or modifications to the described example implementations, are possible, and contemplated by the present disclosure.

Figure 5:
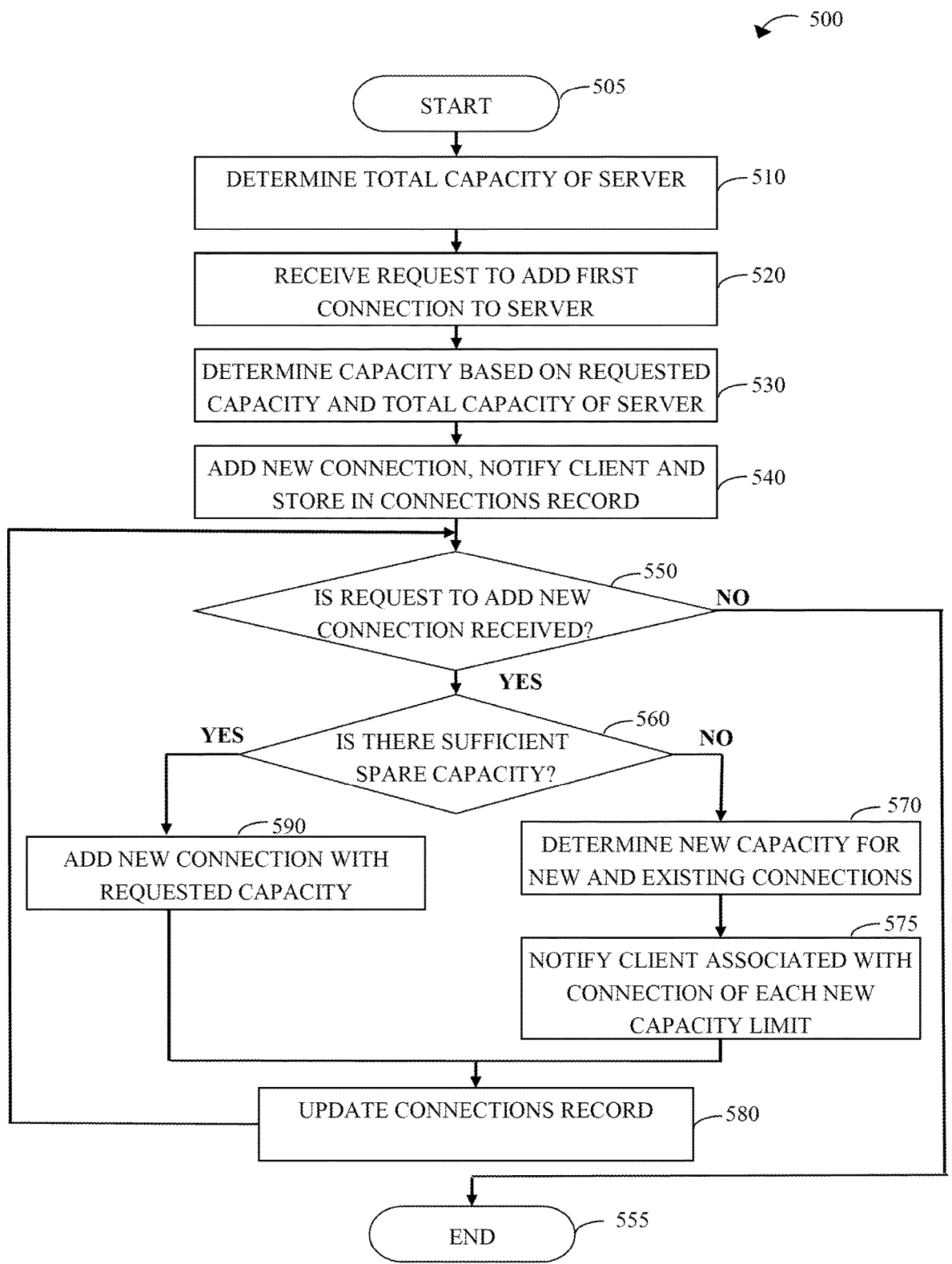
FIG. 5 is a flowchart of an example method for automatically configuring the capacity of connections during a system start-up or restart, in accordance with some implementations of the present disclosure.

FIG. 5 is a flowchart of an example method 500 for automatically configuring the capacity of connections to a server during system start-up or restart, in accordance with some implementations of the present disclosure. The method 500 of FIG. 5 controls the capacity (e.g., bandwidth) of connections as they are added to a server system, such as a transaction processing system, so as to avoid overloading the server, while efficiently utilizing the connections and/or available server resources. In example implementations, method 500 is performed by the connection capacity controller 165 described above with reference to FIG. 1A. In other implementations, method 500 can be performed by a computer, including a server computer, using any components suitable to perform the method. While method will be discussed herein as being performed by a capacity controller, it is not limited to such implementations.

The method 500 starts at block 505. In particular, the method 500 starts in response to a system start-up or restart procedure of a server. At block 510, the method determines the total capacity of the server. In example implementations, the total capacity of the server can be preconfigured based on the resources available to the server system, and so may be obtained from a server record, such as the server capacity record 184 of FIG. 1B. In other example implementations, block 510 determines the total capacity server based on the resources available to the server system, for example as described above in relation to the server capacity manager 170 of FIG. 1A.

At block 520, the capacity controller receives a request to add a first connection with a particular capacity to the server, for example for a new client. In example implementations, the request to add a first connection may be a message, signal, or other indicator, specifying a requested capacity for the first connection. The request can be received from another part of the server, such as the connection manager 160 of the server 110 of FIG. 1A, in response to an event for opening a first connection, or otherwise. In other example implementations, the request may be received from another part of the server, the client device, or otherwise.

At block 530, the capacity controller determines a capacity for the first connection based on the requested capacity and the total capacity of the server. In some example implementations, the capacity controller can determine the capacity to be the requested capacity. In other example implementations, the capacity controller can determine the capacity to be a fixed or varying percentage (e.g., on a sliding scale) of the requested capacity. In some example implementations, the capacity controller can use a threshold, such as a defined proportion of the total capacity of the server, in determining the capacity. For instance, the threshold may correspond to an amount or proportion of the total server capacity that may be allocated to an individual connection. In some example implementations, the threshold is used to decide on the procedure to use for determining the capacity. For example, the capacity controller can determine that the capacity for the first connection to be the requested capacity if the requested capacity is less than or equal to the threshold, and can determine the capacity for the first connection to be only a proportion of the requested capacity (i.e., less than the requested capacity) if the requested capacity is greater than the threshold. In other example implementations, the capacity controller can determine the capacity of the first connection as a minimum or default capacity value.

At block 540, the capacity controller adds the first connection to the server with the determined capacity, notifies the client, and stores the status and capacity of the first connection in the record for the connections to the server, as previously described.

At block 550, the capacity controller determines whether a request to add a further new connection is received. In example implementations, block 550 may be performed periodically. If no further request to add a connection is received after a predetermined time period or number of iterations of block 550, the method ends at block 555. In example implementations, further requests for changes to connections can be thereafter handled in accordance with the methods of one or more of FIGS. 2, 3, and 4, as described above. However, if at block 550 the capacity controller receives a request to add a further new connection, the method proceeds to block 560.

At block 560, the method determines whether the server has sufficient spare capacity to add the connection. In particular, the capacity controller determines the spare capacity of the server, as in block 330 of the method 300 of FIG. 3 and determines whether there is sufficient spare capacity to add the connection. As described above with reference to block 335 of the method 300 of FIG. 3, in example implementations, the amount of spare capacity sufficient to add the connection may be the requested capacity, a fixed or variable proportion of the requested capacity, or a minimum capacity for a connection, according to application requirements. In an example implementation, the capacity controller can determine that there is sufficient spare capacity if the determined spare capacity is greater than or equal to the requested capacity. If the capacity controller determines that the server does not have sufficient spare capacity to add the connection (e.g., with the requested capacity), the method proceeds to block 570.

At block 570, the capacity controller determines the capacity of the new connection and, optionally, one more of the existing active connection(s). In particular, the capacity controller can determine the capacity of connections based on the request, the total server capacity, and the current capacities of the existing active connections. In the illustrated example implementation, the capacity controller can determine the capacity of the respective connections based on one or more of: the spare capacity determined as part of block 560, the particular capacity indicated in the request, and one or more other parameters according to application requirements. In example implementations, the capacity controller can determine the capacity for the new connection and one or more existing active connections using a method, technique, or algorithm that provides a fair allocation of the total available server capacity to each of the connections, by taking into account factors or parameters associated with the corresponding clients such as client priority and requested capacity and the like. Example algorithms are described above in relation to block 340 of the method of FIG. 3. Furthermore, in scenarios involving system restart or otherwise, block 570 may take into account historical information about the connections, such as historical configured capacity, historical usage, historical demand, and the like, as described herein.

In some example implementation, prior to determining the capacity of the new connection and, optionally, one or more existing active connections, the capacity controller at block 570 can consider the negotiation capabilities of the clients associated with the existing active connection(s). In scenarios in which one or more clients are not capable of renegotiating the capacities of their connections, the capacities of the corresponding connections can remain unchanged and can be excluded from the algorithm to determine the capacity of any other existing active connection(s).

At block 575, the capacity controller adds the new connection with the determined capacity and, where appropriate, notifies clients of the new capacity of their corresponding connections, as in block 250 of the method 200 of FIG. 2. At block 580, the capacity controller updates the record of the connections to the server. The capacity controller updates the connections record to identify the new connection as an active connection in the connections record and updates the capacities for the existing connections with the new capacities. The method then returns to block 550 and awaits a further request to add a connection as part of the system start-up or restart procedure.

Returning to block 560, if the capacity controller determines that the server does have sufficient spare capacity to add the connection (e.g., with the requested capacity), the method proceeds to block 590. At block 590, the capacity controller adds the new connection (e.g., with the requested capacity). At block 580 the capacity controller then updates the record of the connections to the server. The capacity controller updates the connections record to identify the new connection as an active connection and to indicate its capacity. The method then returns to block 550 and awaits a further request to add a connection as part of the system start-up or restart.

In example implementations, blocks 560 and 590 of the method 500 of FIG. 5 may be omitted, and the capacity for the new connection and, optionally, one or more existing active connections may be determined in block 570 irrespective of the amount of spare capacity of the server.

As indicated above, in some example implementations, the method 500 of FIG. 5 may utilize historical information about the capacity of connections. In particular, historical information about connections may be stored in an archive of a record of connections to the server, for use during system restart or otherwise. In example implementations having available historical information, block 530 and/or block 570 may determine the capacity of a new connection based on historical capacity information for the corresponding connection. For example, the capacity of each new connection can initially be set to the most recent capacity for the corresponding connection, by default. The algorithm can then verify whether the capacity provides a fair allocation to the connections, taking into account factors or parameters such as historical configured capacity, historical usage, historical demand, and the like, as described above. Renegotiation may then take place in block 570, involving dynamically changing the default capacity of the connections, as appropriate.

Figure 6:
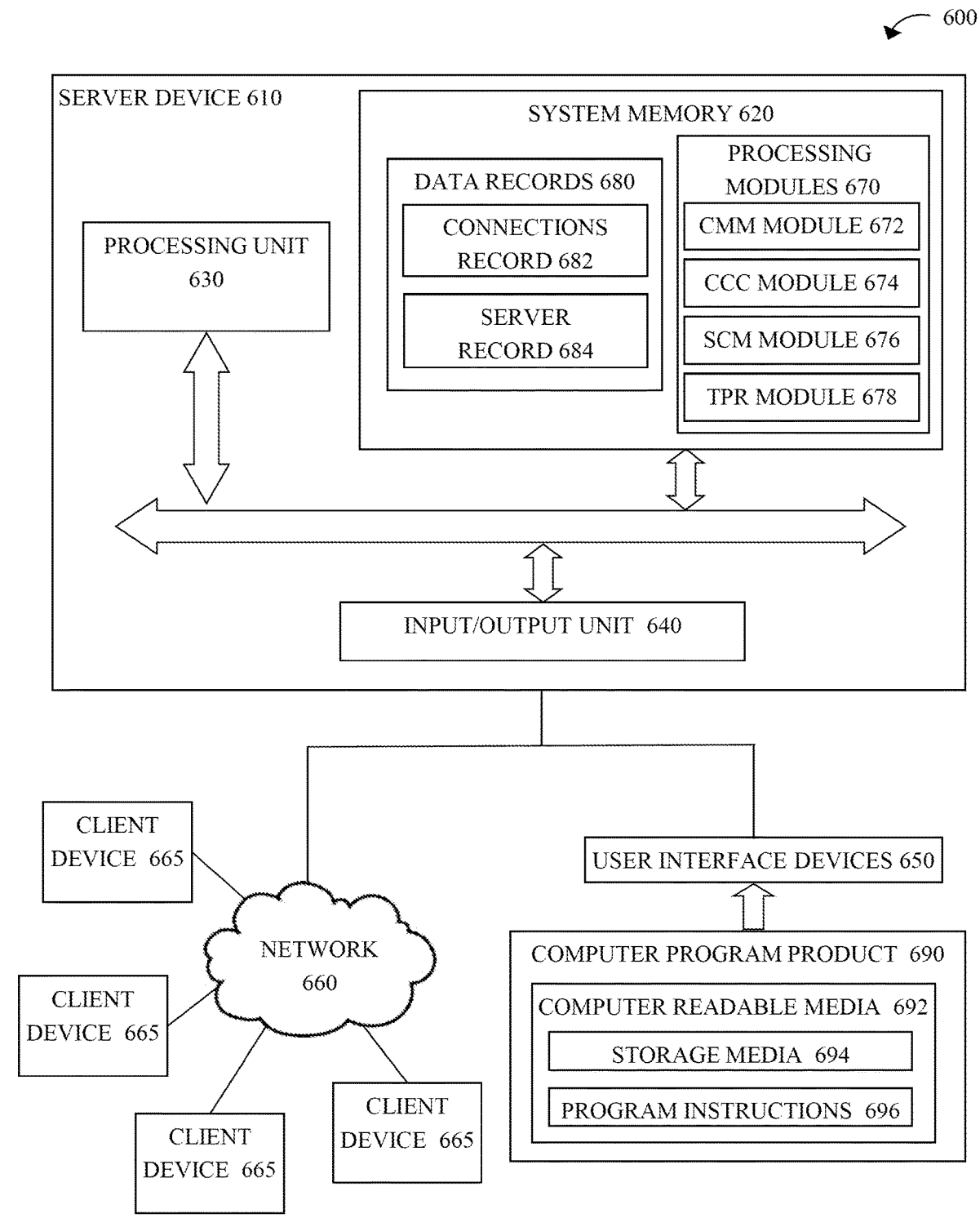
FIG. 6 is a block diagram of a computing system in accordance with example implementations of the present disclosure.

FIG. 6 is a block diagram of a computing system 600 in accordance with example implementations of the present disclosure. In particular, the computing system 600 comprises a server device 610, such as a transaction processing system.

Server device 610 comprises system memory 620, processing unit 630, and input/output (I/O) unit 640. Server device 610 may include user interface devices 650 connected to I/O unit 640. User interface devices 650 may include one or more of a display (e.g., screen or touchscreen), a printer, a keyboard, a pointing device (e.g., mouse, joystick, touchpad), an audio device (e.g. microphone and/or speaker), and any other type of user interface device. I/O unit 640 is configured for connection to a network 660, as described herein, for exchanging messages with multiple client devices 665. Network 660 may comprise any suitable wired or wireless data communications network, such as a local area network (LAN), wide area network (WAN) or the Internet. In some example implementations, I/O unit 640 is configured for connection to more than one network, as described above.

System memory 620 comprises one or more processing modules 670, for performing methods in accordance with the present disclosure. System memory 620 further comprises data records 680, which, in some example implementations, takes the form of a database. Each processing module 670 comprises instructions for execution by processing unit 630 for processing data and/or instructions received from I/O unit 640 and/or stored in system memory 620.

Processing modules 670 include a connection management (CMM) module 672, a connection capacity control (CCC) module 674, a server capacity management (SCM) module 676, and a transaction processing (TPR) module 678. Data records 680 comprise connections record 682 storing data relating to the status and capacity of the connections to the server device 610. In particular, connections record 682 includes, for each connection, a connection identifier, a status indicator, a current capacity, and, optionally, a capacity usage such as a high-water mark of actual capacity usage. Historical data relating to the connections record 682, such as previous capacity and capacity usage, can be retained in the connections record 682 or in a separate archive. Data records 680 further comprise server record 684 storing data relating to the status and capacity of the server device 610. In particular, server record 648 includes the total capacity of the server device 610.

In example implementations, CMM module 672 is configured to receive requests to change the connections to the server device 610 (e.g., to add a new connection or remove an existing connection). CCC module 674 is configured to dynamically configure the capacity of the connections, in response to requests for changes in the connections received by CMM module 672, in accordance with the present disclosure. In example implementations, CCC module 674 is configured to perform one of more of the methods of FIGS. 2, 3, 4, and 5, as described above. SCM module 676 is configured to determine the status and capacity of the server device 610 and to update the server record 684 accordingly. CMM module 672, CCC module 674, or both can be configured to create and update connections record 682. TPR module 678 is configured to concurrently process a maximum number of tasks, using available resources of system memory 620 and processing unit 630, up to the total capacity of the server device 610 stored in server record 684, in response to concurrent requests received over connections from client devices 665 as described herein.

With continuing reference to FIG. 6, a computer program product 690 is provided. The computer program product 690 includes computer readable media 692 having storage media 694 and program instructions 696 (i.e., program code) embodied therewith. The program instructions 696 are configured to be loaded onto system memory 620 of server device 610 via I/O unit 640, for example by one of user interface devices 650 or other devices connected to network 660. In example implementations, program instructions 696 can be configured to perform one of more of the methods disclosed herein, such as the methods of FIGS. 2, 3, 4, and 5 as described above.

As the skilled person will appreciate, references to "determining" a parameter or value include not only deriving or calculating the value or parameter, but also include obtaining the value or parameter from elsewhere, such as from another agent, module, or subsystem, or from a look-up table or other data record in data storage. References to "configuring" a value or parameter include setting a determined value or parameter.

While the present disclosure has been described and illustrated with reference to example implementations, the present disclosure lends itself to many different variations and modifications not specifically illustrated herein.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of a computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to explain the principles of the implementations, the practical application or technical improvement over technologies found in the marketplace, or to enable others of ordinary skill in the art to understand the implementations disclosed herein.

What is claimed is:

1. A computer implemented method, comprising:
   receiving a request to change a first connection to a server;
   determining one or more active connections to the server;
   determining a corresponding current capacity of each active connection of the one or more active connections;
   determining a new capacity for one or more connections of the first connection and the one or more active connections to the server;
   determining that a spare capacity of the server is insufficient for the first connection;
   allocating a capacity to the first connection based on the request; and
   adjusting the current capacity of one or more of the one or more active connections, comprising:
      reducing the current capacity of at least a portion of the one or more active connections in proportion to the respective current capacity of the at least a portion of the one or more active connections.

2. The method of claim 1, wherein the determining the new capacity for the one or more connections to the server comprises using an algorithm that provides a fair allocation of the total capacity to each connection based on one or more parameters associated with the respective client connection.

3. The method of claim 1, wherein:
   the request to change the first connection is a request to add the first connection to the server;
   the request specifies a requested capacity for the first connection; and
   the determining the new capacity for the one or more connections of the first connection and the one or more active connections to the server is based on the requested capacity for the first connection.

4. The method of claim 3, further comprising:
   determining a spare capacity of the server based on the total capacity and the current capacities of the one or more active connections.

5. The method of claim 4, wherein the determining the new capacity for one or more connections of the first connection and the one or more active connections to the server further comprises:
   calculating the new capacity for each of the one or more connections of the first connection and the one or more active connections based on the request and the determined spare capacity.

6. The method of claim 4, wherein the determining the new capacity for one or more connections of the first connection and the one or more active connections to the server further comprises:
   determining that the determined spare capacity of the server is sufficient for the first connection; and
   allocating a capacity to the first connection based on the request.

7. The method of claim 1, wherein the reducing of the current capacity of one or more of the one or more active connections is based on an amount of capacity required to enable allocation of the capacity to the first connection.

8. The method of claim 7, wherein the reducing of the current capacity of one or more of the one or more active connections is further based on one or more parameters selected from the group consisting of: current capacity of the respective connection;
requested capacity of the respective connection, and renegotiation capability of the respective connection.

9. The method of claim 1, wherein:
the request to change the first connection is a request to remove the first connection;
the request identifies the first connection to be removed; and
the determining the new capacity for one or more connections of the first connection and the one or more active connections to the server further comprises determining an increased capacity for one or more of the one or more active connections.

10. The method of claim 9, further comprising:
determining an amount of capacity of the server for reallocation to the one or more active connections based on a current capacity of the first connection.

11. The method of claim 10, wherein the determining an increased capacity for one or more of the one or more active connections is based on the determined amount of capacity of the server for reallocation.

12. The method of claim 11, wherein the determining an increased capacity for one or more of the one or more active connections is further based on one or more parameters selected from the group consisting of: current capacity of the respective connection; originally negotiated capacity of the respective connection, originally requested capacity of the respective connection, and renegotiation capability of the respective connection.

13. The method of claim 1, further comprising:
notifying one or more clients associated with the new capacity.

14. The method of claim 1, further comprising:
updating a record of connections to the server with the new capacity.

15. A system, comprising:
a processor associated with a server, wherein the processor is configured to:
receive a request to change a first connection to a server;
determine one or more active connections to the server;
determine a new capacity for one or more connections of the first connection and the one or more active connections to the server;
determine that a spare capacity of the server is insufficient for the first connection;
allocate a capacity to the first connection based on the request; and
adjust the current capacity of one or more of the one or more active connections, comprising:
reduce the current capacity of at least a portion of the one or more active connections in proportion to the respective current capacity of the at least a portion of the one or more active connections.

16. The system of claim 15, wherein the processor is further configured to:
determine the new capacity for one or more connections to the server further comprises through an algorithm that provides a fair allocation of the total capacity to each connection based on one or more parameters associated with the respective client connection.

17. The system of claim 15, wherein:
the request to change the first connection is a request to add the first connection to the server;
the request specifies a requested capacity for the first connection; and
the processor is further configured to:
determine the new capacity for the one or more connections of the first connection and the one or more active connections to the server further based on the requested capacity for the first connection.

18. The system of claim 15, wherein:
the request to change the first connection is a request to remove the first connection;
the request identifies the first connection to be removed; and
the processor is further configured to:
determine the new capacity for the one or more connections of the first connection and the one or more active connections to the server through determining an increased capacity for one or more of the one or more active connections.

19. A computer program product comprising a computer readable storage medium having program instructions embodied therewith, wherein the program instructions executable by a processor to cause the processor to:
receive a request to change a first connection to a server;
determine one or more active connections to the server;
determine a new capacity for one or more connections of the first connection and the one or more active connections to the server;
determine that a spare capacity of the server is insufficient for the first connection;
allocate a capacity to the first connection based on the request; and
adjust the current capacity of one or more of the one or more active connections, comprising:
reduce the current capacity of at least a portion of the one or more active connections in proportion to the respective current capacity of the at least a portion of the one or more active connections.

20. A computer implemented method, comprising:
receiving a request to add a first connection to a server as part of a start-up procedure of the server;
determining a capacity for the first connection to the server;
receiving one or more requests to add one or more further connections to the server as part of the start-up procedure;
determining, for each request to add one or more further connections, one or more existing connections to the server and corresponding current capacities for each existing connection;
determining, for each request of the one or more requests to add one or more further connections, a new capacity for the one or more further connections and for each existing connection to the server;
determining that a spare capacity of the server is insufficient for the one or more further connections;
allocating a capacity to the first connection based on each request of the one or more requests; and
adjusting the current capacity of one or more of the one or more existing connections, comprising:
reducing the current capacity of at least a portion of the one or more existing connections in proportion to the respective current capacity of the at least a portion of the one or more existing connections.

21. The method of claim 20, wherein the determining the new capacity for the one or more further connections and for each existing connection to the server uses an algorithm that provides a fair allocation of the total capacity to each of the connections based on one or more parameters associated with the respective connection.

22. The method of claim 20, wherein:
the one or more requests to add one or more further connections to the server specify a requested capacity for the one or more further connections; and
the determining the new capacity for the one or more further connections and for each existing connection to the server is based on the requested capacity for the one or more further connections, the total capacity, and the current capacities of the existing connections.

23. The method of claim 22, further comprising:
determining a spare capacity of the server based on the total capacity and the current capacities of the existing connections; and
calculating the new capacity for the one or more further connections and for each existing connection based on the request and the spare capacity.

24. The method of claim 23, wherein the determining the new capacity for one or more further connections and for each existing connection to the server further comprises:
calculating the new capacity for each of the existing connections based on the one or more requests and the determined spare capacity;
determining that the determined spare capacity of the server is sufficient for the one or more requests; and
allocating a capacity to the first connection based on the one or more requests.

25. The method of claim 24, wherein reducing the current capacity of one or more existing connections is based on an amount of capacity required to enable allocation of capacity to the one or more further connections and one or more parameters selected from the group consisting of: current capacity of the respective connection; requested capacity of the respective connection, and renegotiation capability of the respective connection.

* * * * *